United States Patent
Thompson et al.

(10) Patent No.: US 12,461,015 B2
(45) Date of Patent: Nov. 4, 2025

(54) METHOD FOR DETERMINING CORROSION OF AN OBJECT

(71) Applicant: The Boeing Company, Arlington, VA (US)

(72) Inventors: Richard Joel Thompson, Laceys Spring, AL (US); Kristen Smith Williams, Madison, AL (US)

(73) Assignee: The Boeing Company, Arlington, VA (US)

( * ) Notice: Subject to any disclaimer, the term of this patent is extended or adjusted under 35 U.S.C. 154(b) by 57 days.

(21) Appl. No.: 18/352,475

(22) Filed: Jul. 14, 2023

(65) Prior Publication Data

US 2025/0020575 A1    Jan. 16, 2025

(51) Int. Cl.
G01N 17/00    (2006.01)

(52) U.S. Cl.
CPC ................... *G01N 17/006* (2013.01)

(58) Field of Classification Search
CPC .................................................. G01N 17/006
USPC ......................................................... 324/700
See application file for complete search history.

(56) References Cited

U.S. PATENT DOCUMENTS

| | | |
|---|---|---|
| 5,583,426 A | 12/1996 | Tiefnig |
| 5,854,557 A | 12/1998 | Tiefnig |
| 7,345,877 B2 | 3/2008 | Asfia et al. |
| 10,380,278 B2 | 8/2019 | Thompson et al. |
| 10,937,006 B2 | 3/2021 | Engelbart et al. |
| 2008/0234994 A1 | 9/2008 | Goebel et al. |
| 2009/0058427 A1 | 3/2009 | Materer et al. |
| 2011/0060568 A1 | 3/2011 | Goldfine et al. |
| 2012/0074968 A1* | 3/2012 | Chu ............... G01N 17/002 324/700 |
| 2013/0304438 A1* | 11/2013 | Bailey ............... G06F 30/00 703/6 |
| 2014/0278148 A1 | 9/2014 | Ziegel et al. |
| 2015/0268152 A1* | 9/2015 | Friedersdorf ......... G01N 27/02 73/25.01 |
| 2017/0136757 A1 | 5/2017 | Georgeson et al. |

(Continued)

FOREIGN PATENT DOCUMENTS

| | | |
|---|---|---|
| CN | 112730205 A | 4/2021 |
| CN | 113588528 A | 11/2021 |

(Continued)

OTHER PUBLICATIONS

European Patent Office, Extended European Search Report Issued in Application No. 24172080.4, Sep. 18, 2024, 11 pages.

(Continued)

*Primary Examiner* — Raul J Rios Russo
(74) *Attorney, Agent, or Firm* — Alleman Hall & Tuttle LLP

(57) ABSTRACT

Methods of determining corrosion of an object that occurs over a time period. The methods determine physical factors of the object and environmental factors that occur during the time period. Node points are determined on the object. At different times during the time period, the methods determine the corrosion of the object at the node points based on the physical factors and the environmental factors. A cumulative corrosion of the object is determined based on the corrosion determined at each of the node points at each of the times.

20 Claims, 5 Drawing Sheets

(56) References Cited

U.S. PATENT DOCUMENTS

| | | | |
|---|---|---|---|
| 2017/0205333 | A1 | 7/2017 | Friedersdorf et al. |
| 2018/0017481 | A1 | 1/2018 | Thompson et al. |
| 2019/0049987 | A1 | 2/2019 | Djuric et al. |
| 2020/0012871 | A1 | 1/2020 | Lee et al. |
| 2020/0272704 | A1 | 8/2020 | Laverty et al. |
| 2021/0056365 | A1 | 2/2021 | Sivan et al. |
| 2021/0063336 | A1 | 3/2021 | Ghods et al. |
| 2021/0072144 | A1 | 3/2021 | Omoda et al. |
| 2021/0388579 | A1 | 12/2021 | Kennedy |
| 2022/0164494 | A1 | 5/2022 | Thompson et al. |
| 2022/0164681 | A1 | 5/2022 | Aurongzeb et al. |
| 2024/0085309 | A1* | 3/2024 | Thompson ............ G06N 20/00 |
| 2024/0116187 | A1* | 4/2024 | Moy ...................... B25J 9/1697 |
| 2024/0119542 | A1* | 4/2024 | Horine .................. G06Q 50/02 |

FOREIGN PATENT DOCUMENTS

| | | |
|---|---|---|
| CN | 113591385 A | 11/2021 |
| FR | 2917520 B1 | 9/2009 |
| JP | 2004252781 A | 9/2004 |
| WO | 2020162098 A1 | 2/2021 |
| WO | 2021181369 A1 | 9/2021 |

OTHER PUBLICATIONS

United States Patent and Trademark Office, Office Action Issued in U.S. Appl. No. 17/462,928, filed Sep. 26, 2024, 86 pages.

Palani, S. et al., "Modeling Galvanic Corrosion Behavior of Carbon Fiber Composite/AL 7050 Joints Under Extended Exposures," Proceedings of the 2017 Department of Defense—Allied nations Technical Corrosion Conference, Aug. 7, 2017, Brimingham, Alabama, 8 pages.

Rinaldi, G. et al., "Corrosion Sensor Development for Condition-Based Maintenance of Aircraft," International Journal of Aerospace Engineering, vol. 2012, Jun. 27, 2012, 12 pages.

Sarkar, S. et al., "Stochastic reduced order models for uncertainty quantification of intergranular corrosion rates," Corrosion Science, vol. 80, Mar. 2014, 12 pages.

Song, X. et al., "Multi-factor mining and corrosion rate prediction model construction of carbon steel under dynamic atmospheric corrosion environment," Engineering Failure Analysis, vol. 134, Apr. 2022, 14 pages.

Williams, K.S. et al., "Galvanic Corrosion Risk Mapping using Coupled Empirical and Multiphysics Corrosion Models," Proceedings of the 2017 Department of Defense—Allied nations Technical Corrosion Conference, Aug. 7, 2017, Brimingham, Alabama, 11 pages.

United States Patent and Trademark Office, Office Action Issued in U.S. Appl. No. 17/943,632, filed Dec. 24, 2024, 34 pages.

Bellinger, N.C.. et al., "Corrosion Pillowing Stresses in Fuselage Lap Joints," AIAA Journal, vol. 35, No. 2, Feb. 1997, 4 pages.

Liao, M. et al., "Corrosion Risk Assessment of Aircraft Structures," Journal of ASTM International, vol. 1, No. 8, Sep. 2004, 11 pages.

Cole, I.S. et al., "Development of a Sensor-Based Learning Approach to Prognostics in Intelligent Vehicle Health Monitoring," Proceedings of the 2008 International Conference on Prognostics and Health Management, Oct. 6, 2008, Denver, CO, 7 pages.

Hickman, G.A et al., "Application of Smart Structures to Aircraft Health Monitoring," Proceedings of the First Joint U.S./Japan Conference on Adaptive Structures, Nov. 13, 1990, Maui, HI, 20 pages.

Komorowski, J.P. et al., "Research in corrosion of ageing transport aircraft structures at SMPL," CASI Journal : IAR 50th Anniversary Edition, vol. 47, No. 3, Sep. 2001, 24 pages.

Boyer, R.R., "New Titanium Applications on the Boeing 777 Airplane," JOM, vol. 44, May 1992, 3 pages.

Froes, F.H., "Titanium—Physical Metallurgy Processing and Applications," ASM International, Jan. 1, 2015, 11 pages.

"FAA Foreign Object Debris Program," Federal Aviation Administration, Available Online at https://www.faa.gov/airports/airport/safety/fod/, Last Modified Sep. 3, 2020, 1 pages.

Moran, R.L., "What is FOD?" U.S. Army Risk Management Magazine, Available Online at https://safety.army.mil/MEDIA/Risk-Management-Magazine/ArtMID/7428/ArticleID/6199/What-is-FOD, Jan. 20, 2019, 4 pages.

European Patent Office, Extended European Search Report Issued in Application No. 23188055.0, Jan. 3, 2024, 9 pages.

Adey, R., et al., "Predicting Cumulative Galvanic Corrosion Damage in Aircraft Structures", STO NATO, Jan. 1, 2019, pp. 1-14.

Boswell-Koller, C., et al., "Statistical Analysis of Environmental Parameters: Correlations between Time of Wetness and Corrosion Severity", Science Section, Corrosion Journal, NACE International, May 1, 2019, pp. 498-504, vol. 75, issue 5.

Macha, E., et al., "Development of a Methodology to Predict Atmospheric Corrosion Severity Using Corrosion Sensor Technologies", International Standards Organization, NACE International, 2019-01-01, pp. 1-14.

Diao, Y. et al., "Improvement of the machine learning-based corrosion rate prediction model through the optimization of input features," Materials and Design, vol. 198, Nov. 12, 2020, 8 pages.

Rocca, E. et al., "Long term corrosion of aluminium materials of heritage: analysis and diagnosis of aeronautic collection," Corrosion Engineering, Science and Technology, vol. 45, No. 5, Oct. 1, 2010, 5 pages.

Rose, A. et al., "Innovative Approach for Predicting Galvanic Corrosion Effects on Airframe Systems," Proceedings of NACE Corrosion Conference & Expo, Mar. 17, 2013, Orlando, FL, 12 pages.

\* cited by examiner

METHOD FOR DETERMINING CORROSION OF AN OBJECT

TECHNOLOGICAL FIELD

The present disclosure relates generally to the field of corrosion determination and, more specifically, corrosion determination based on physical factors and environmental factors.

BACKGROUND

Vehicles (e.g., aircraft, ships, trucks, cars, trains and other rail-based transport, spacecraft, undersea craft, and trailers), equipment, and buildings, as well as other fixed or non-fixed objects or structures (such vehicles, equipment, buildings, objects, and structures collectively referred to hereinafter as "objects") are constructed from materials that are susceptible to corrosion. This is true with respect to both the entire object as well as smaller components or portions thereof. Corrosion can be a particular issue on objects that are used or located in harsh environmental conditions.

The materials from which the objects are constructed can experience different types of corrosion. One example includes galvanic corrosion that occurs when two dissimilar materials are in contact with a corrosive electrolyte, and a differential in electrochemical potential across them drives a small current flow. Another example of corrosion is pitting that results from environmental effects.

Regardless of how it occurs, corrosion is a major factor for determining the overall lifetime and maintenance schedule of an object, mostly in the form of shortening such lifetime as compared to if corrosion was somehow prevented or its effects were able to be reduced. As an example of the negative impact of corrosion, the issue of corrosion of military equipment alone is estimated to cost the United States Department of Defense almost $20 billion annually.

It is difficult to accurately determine the effects of corrosion when designing an object. The reality is doing so generally requires a skilled designer with a large resume of design experience, subjective decision-making, and knowledge.

Prior solutions for determining the effects of corrosion of an object attempt to identify a physics-based computational model for material interaction. However, these models are notoriously difficult to predict, and data on which one can accurately rely is often scarce. Also, the complex physics involved often necessitates computationally expensive first-principles modeling, which can take lengthy time frames for a single solution. Empirical models of corrosion have also been developed but require substantial and expensive testing to construct and may take very long periods of time to compare and validate due to the typical time scale for corrosion damage to transpire. Additionally, empirical models often do not include time-dependent and/or position-dependent factors in the corrosion damage, but instead only provide gross estimates under specified environmental conditions.

Moreover, many design processes do not account for corrosion until the full object design exists. This can sometimes occur only after the object has been designed, manufactured, and is in use in the field. In some examples, a corrosion analysis is not performed until after damage is observed on the object. One current procedure is to perform a root cause analysis (RCA) to determine the cause of the corrosion. The RCA is not used to design the object, but rather to remediate the problem after the corrosion has already occurred, and thus does not represent an ideal solution.

SUMMARY

One aspect is directed to a method of determining corrosion of an object that occurs over a time period. The method comprises: determining physical factors of the object; determining environmental factors that occur during the time period; determining a plurality of node points on the object; at a plurality of times during the time period, determining the corrosion of the object at the node points based on the physical factors and the environmental factors; and determining a cumulative corrosion of the object based on the corrosion determined at each of the node points at each of the plurality of times.

In another aspect, the method further comprises determining the environmental factors based on historical weather data for one or more geographic locations where the object was located during the time period.

In another aspect, determining the physical factors comprises determining a shape of the object and a material of the object.

In another aspect, the method further comprises for each of the plurality of times, determining whether a wetness condition occurs and determining that the corrosion is zero when the wetness condition does not occur.

In another aspect, the method further comprises determining external forces that are applied to the object over the time period.

In another aspect, the method further comprises determining a mesh that extends over the object and determining the plurality of node points based on the mesh.

In another aspect, the method further comprises determining the physical factors of the object based on a date range and a geographic location received from a user.

One aspect is directed to a method of determining corrosion of an object that occurs over a time period. The method comprises: determining physical factors and environmental factors for a geographic location of the object for a time period; at each of a plurality of times that occur during the time period, determining corrosion at node points that are spaced apart on the object; and accumulating the corrosion for the plurality of times at the node points and determining a cumulative corrosion of the object.

In another aspect, the method further comprises receiving inputs comprising a date range of the time period, the geographic location, and an identification of the object.

In another aspect, the method further comprises receiving a geometric model of the object and determining positioning of the node points on the object based on the geometric model.

In another aspect, the environmental factors comprise two or more of relative humidity, precipitation, temperature, and dew point.

In another aspect, the method further comprises determining whether a wetness condition occurs at the node points at each of the plurality of times, and determining that there is no corrosion at the node points for the plurality of times when the wetness condition does not occur.

In another aspect, the time period is a historic period that has already occurred and the environmental factors are based on weather conditions that occurred at the geographic location during the time period.

In another aspect, the physical factors and environmental factors comprise predicted factors based on conditions that are expected to be encountered by the object during use.

In another aspect, the object is an aircraft and the geographic location comprises a plurality of locations where the aircraft traveled during the time period.

One aspect is directed to a computing device configured to determine corrosion of an object. The computing device comprises memory circuitry that stores programming instructions, and processing circuitry configured to execute the program instructions to cause the computing device to: receive a date range, a geographic location of the object, and an identification of the object; determine a plurality of node points on the object based on the identification of the object; for a plurality of times during the time period: determine external forces that are exerted on the node points; determine a film thickness on the node points; determine environmental conditions at the node points; and determine corrosion at the node points based on the external forces, the film thickness, and the environmental conditions.

In another aspect, the processing circuitry is further configured to determine a cumulative corrosion of the object based on the corrosion on the node points for the plurality of times.

In another aspect, the processing circuitry is further configured to determine a wetness condition of the node points at each of the plurality of times and determine the film thickness on the node points based on the wetness condition.

In another aspect, the processing circuitry is further configured to determine there is no film thickness on the node points when the wetness condition does not occur.

In another aspect, the processing circuitry is further configured to determine from a remote source environmental factors that act on the object during the plurality of times.

The features, functions and advantages that have been discussed can be achieved independently in various aspects or may be combined in yet other aspects, further details of which can be seen with reference to the following description and the drawings.

DETAILED DESCRIPTION

The present application is directed to methods of determining corrosion of an object. The method accounts for the development of continuous or discontinuous films that may change over time and are different across the surface geometry of the object. The methods can be used to predict corrosion on an existing object that has been exposed over a date range to environmental conditions that can cause corrosion. The method can also be used to predict the corrosion on an object that will be exposed to particular environmental conditions.

Figure 1:
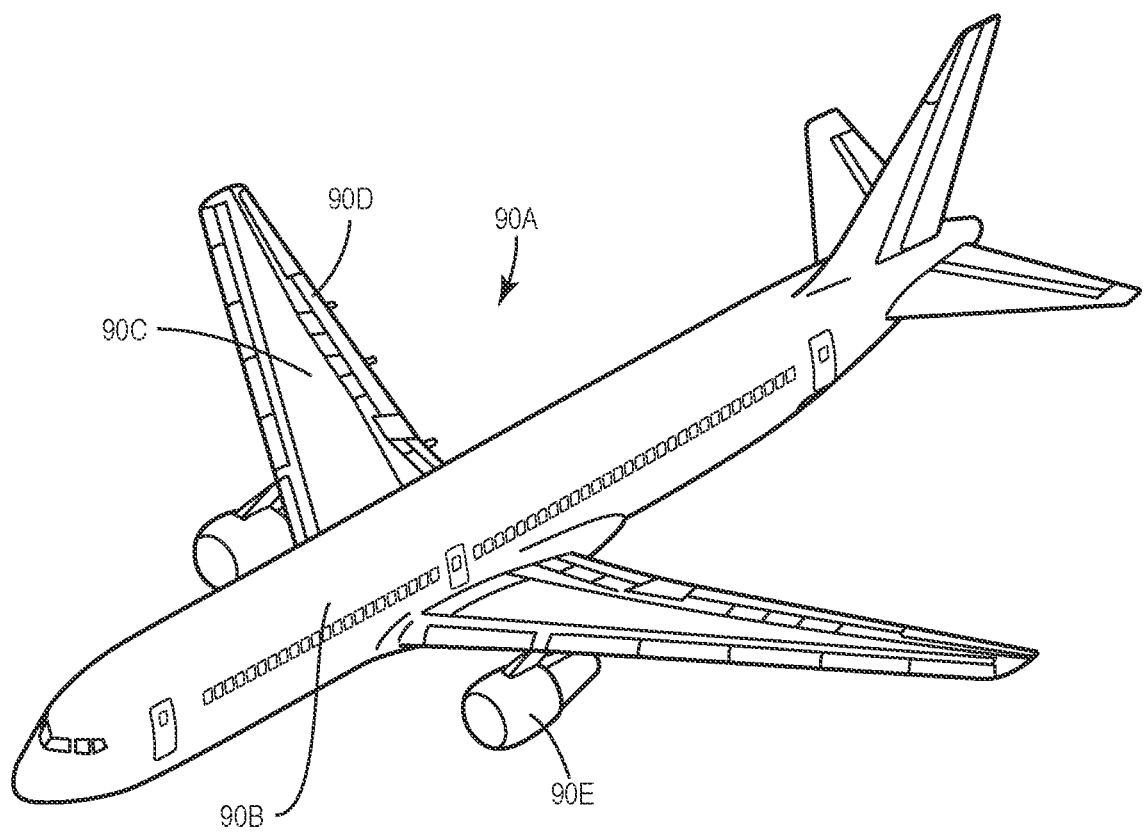
FIG. 1 is a perspective view of an aircraft.

FIG. 1 illustrates examples of objects 90 that are associated with an aircraft. In some examples, the object 90A is the entire aircraft. In other examples, the object 90 is one or more limited sections of the vehicle, such as a fuselage 90B, wing 90C, flight control member 90D, and engine cover 90E. Other examples within an aircraft context include but are not limited to ribs, spars, stringers, and engine components.

The methods of determining corrosion use one or more factors. Examples of factors include physical factors of the object 90 and environmental factors where the object 90 is located or to which it travels, visits, or is brought. The methods avoid the need for a computationally expensive high-fidelity simulation approach while still retaining sufficient fidelity to determine a time-dependent, position-dependent corrosion damage field for the object 90 in various environmental conditions.

Figure 2:
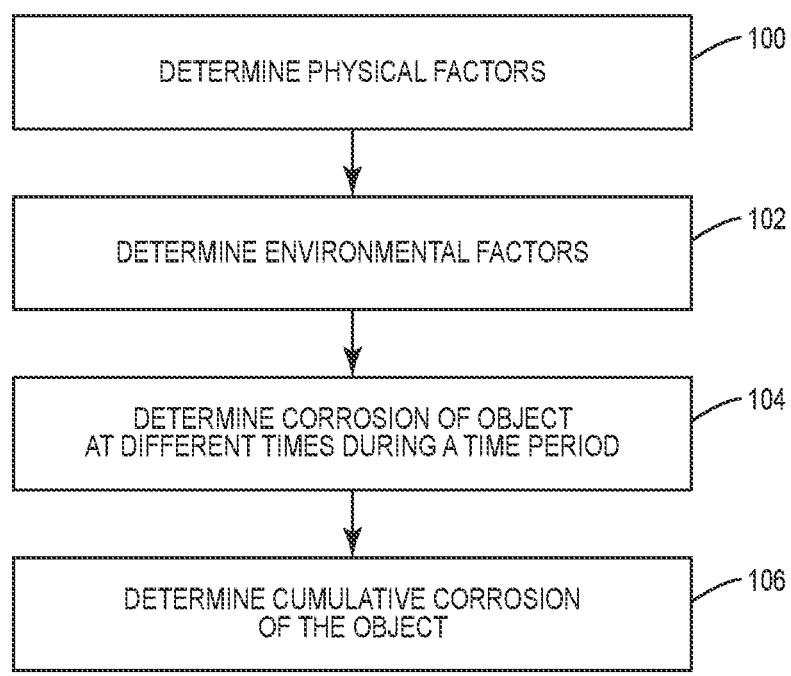
FIG. 2 is a flowchart diagram of a method of determining corrosion of an object.

FIG. 2 illustrates a method of determining corrosion of an object. The method includes determining one or more physical factors of the object (block 100). Physical factors can include but are not limited to the material from which the object is constructed and can include but are not limited to one or more of the substrate and finish of the material. Another physical factor is the thickness of the material, including but not limited to the thicknesses of the substrate and finish. Physical factors also include but are not limited to the shape of the object. One example of shape is the surface geometry such as curvature, angular surfaces, edges, openings, punch-outs, coupons, and seams. Physical factors can also include but are not limited to connections between two or more different sections, such as rivets, bolts, seams, welds, joints, and bonds.

The method also includes determining environmental factors (block 102). Examples include but are not limited to one or more weather conditions, which can include but are not limited to one or more of relative humidity, climate, precipitation, temperature, dew point, dry or wet bulb temperatures, wind speed, wind direction, and/or solar irradiance. Another weather condition is distance from an ocean which accounts for the amount of salt in the air (i.e., air along a coast contains more salt than the air away from the ocean). Air pollution, smoke (e.g., from wildfires) and smog are also non-limiting examples of what can also be included as environmental factors.

The method uses these factors to determine the corrosion of the object at one or more times during a given time period (block 104). The time period, and times during the time period for testing, can be established by a user or can be a default setting. In one non-limiting example, the time period is six months and the testing occurs once a week.

In some examples, the determination of the corrosion at the one or more times is the final output. In other examples, the method also includes determining a cumulative corrosion of the object based on the corrosion determinations from the different times (block 106).

In some examples, the determination of corrosion on the object occurs for an existing object. For example, determining the corrosion on a wing assembly that is part of an aircraft and that has been in continuous or active use during a given time period (e.g., corrosion on a wing that has been in service for a nine month time period). The physical factors are established from the existing object and the environmental conditions are based on the known weather and/or climate conditions that occurred during the time period.

In some examples, the corrosion determination uses a proposed design and/or artificial weather conditions. In some examples, the proposed design uses engineering specifications for the object. The weather conditions can be based on various numbers, such as averages for a given geographic location, or record high or low values for a given geographic location. This testing in essence determines the corrosion that would have occurred on the object had it been exposed to the weather conditions.

Figure 3:
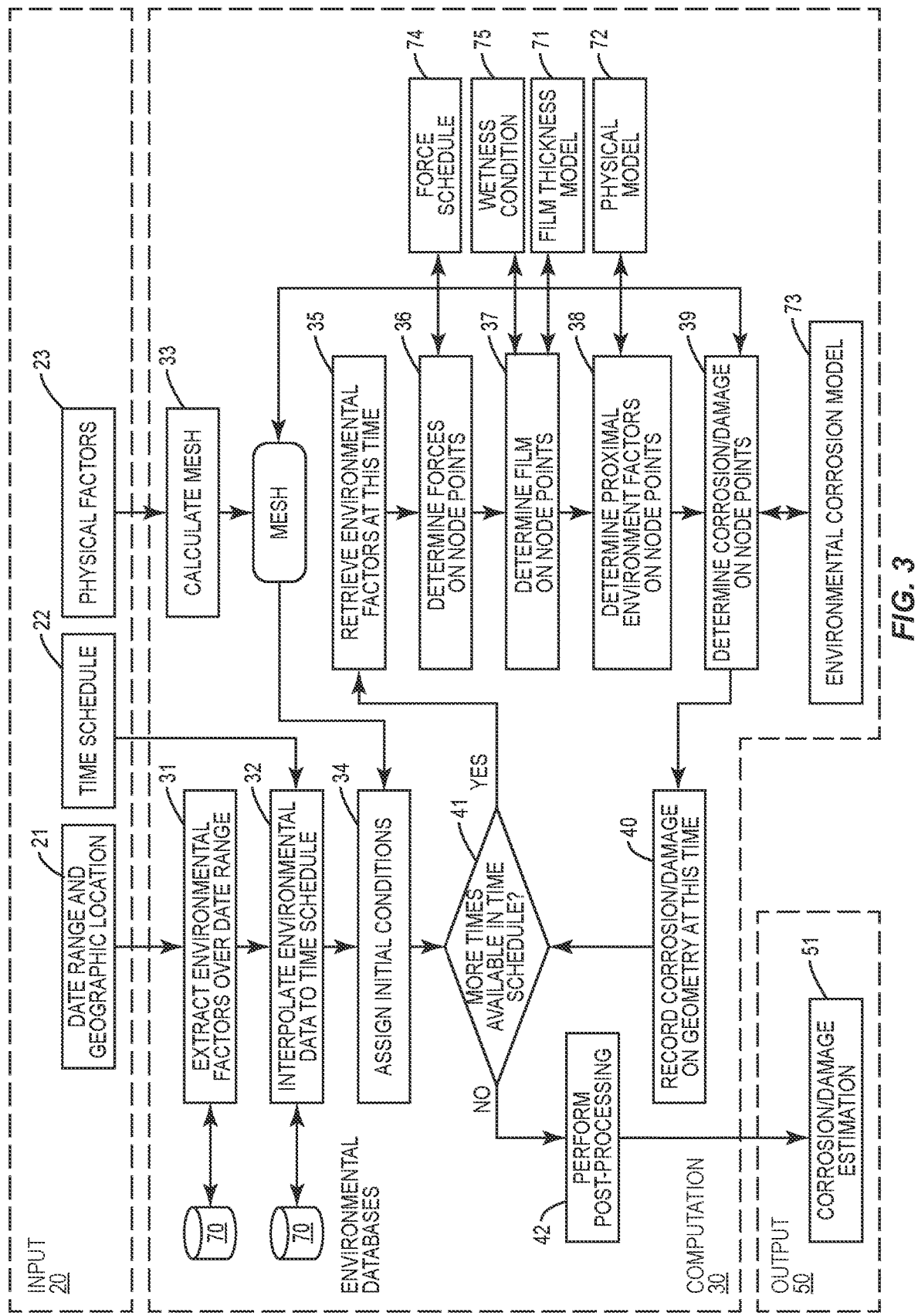
FIG. 3 is a flowchart diagram of another method of determining corrosion of an object.

FIG. 3 illustrates a method of determining corrosion of an object. This example uses an existing object that has been exposed to weather conditions over a given date range. The method of determining corrosion is generally divided into an input section 20, a computation section 30, and an output section 50.

The input section 20 provides for establishing the one or more factors for determining the corrosion of the object. These factors can be input by a user, or part of an automated process that analyzes corrosion. The factors include a date range and geographic location (block 21). The geographic location can include various levels of detail. Examples include but are not limited to a county, region, city, specific address (e.g., airport address, building address), and latitude/longitude. For an object that moves during the date range (e.g., an aircraft), the geographic location can include multiple locations. In one example for an object that is an aircraft, the geographic location includes each of the destinations where the aircraft landed during the given time period.

Another input is the time schedule (block 22). The time schedule provides for the frequency for the corrosion calculations. Examples include but are not limited to monthly, weekly, daily, and hourly.

The input section 20 also includes the physical factors (block 23), examples of which include but are not limited to material, thickness, shape, surface geometry, and connections. In some examples, the physical factor is a specific make/model of the object (e.g., 1997 BMW 328i sedan). In another example, the user inputs engineering drawings of the object that include the shape and thickness. In some examples, one or more remote sources 70 are accessed to retrieve the applicable data (e.g., surface geometry of a Boeing 737 aircraft).

The computation section 30 uses the factors from the input section 20 and calculates the corrosion of the object. The environmental factors are determined for the input date range and geographic location (block 31). In one example, the environmental factors are accessed from one or more remote sources 70 containing environmental data such as historical weather data, climate data, and sensor measurements. The remote sources 70 can include but are not limited to different databases, sites available through the network (e.g., Internet), and different model sources. In some examples, the databases can be either external (e.g., a publicly-available API) or internal (e.g., a file or internal server collection of measurements). Examples of sources 70 available through a network include but are not limited to the National Oceanic and Atmospheric Administration (NOAA), Integrated Surface Database (ISD), and Meteorological Assimilation Data Ingest System (MADIS), and Parameter-Elevation Regressions on Independent Slopes Model (PRISM).

In some examples, one or more of the environmental factors are based on sensor readings. The object includes one or more sensors that monitor one or more environmental conditions. Readings from the one or more sensors are stored and accessed as needed to provide the environmental data. In one specific example, the object is an aircraft that includes multiple sensors which monitor the environmental conditions.

In instances where environmental factors are not available for the date range and/or geographic location, the data is obtained by interpolation using known data (block 32).

Location conversion and date conversion determines the closest available environmental and geographic data. In one specific example, location conversion transforms an input latitude/longitude to a nearest weather collection station where environmental data is available. In some examples, this step (block 32) includes supplemental calculations to determine additional environmental data (e.g., determining dew point based on other known parameters).

Figure 4:
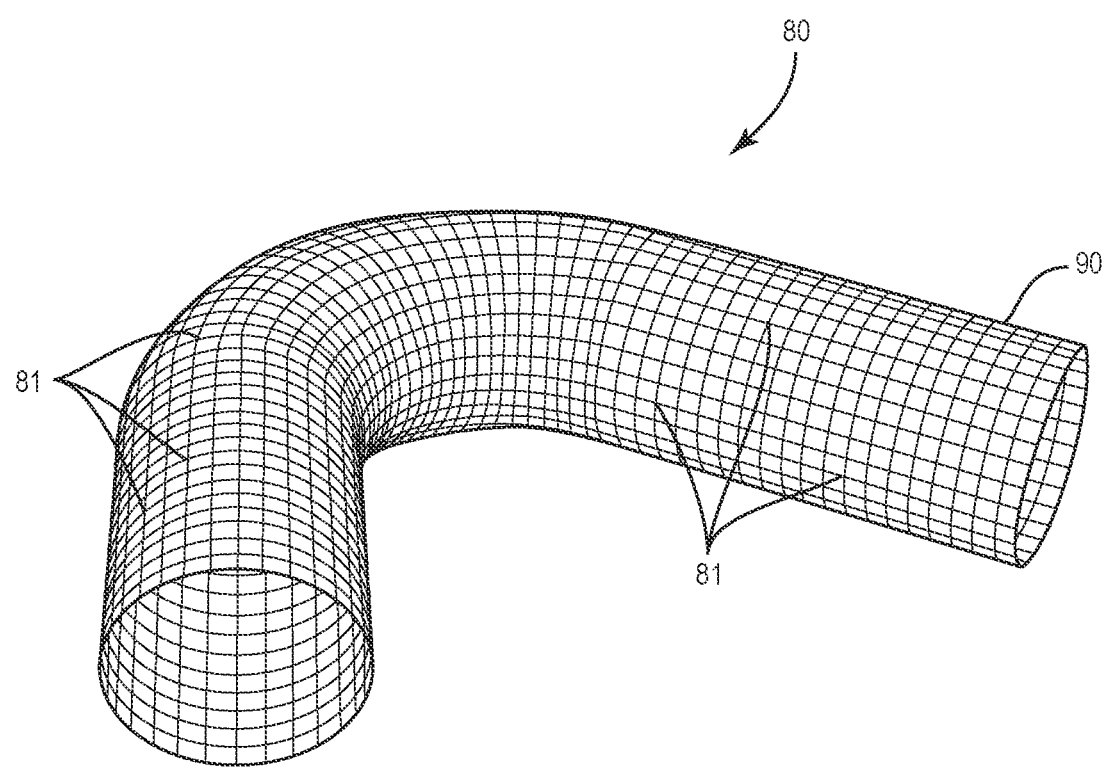
FIG. 4 is a schematic diagram of a computer design of an object with a mesh that includes node points.

One or more of the physical factors are used to determine a mesh 80 of the object (block 33). The mesh 80 corresponds to the surface geometry of the object. In one example illustrated in FIG. 4, the mesh 80 includes an interlaced network of node points 81 that extend along the surface of the object. The number and positioning of the node points 81 on the object can vary. In some examples, and as illustrated in FIG. 4, the node points 81 are evenly spaced and positioned about the object. Other examples include node points 81 positioned at one or more limited sections of the object, such as but not limited to a particular surface or an exposed edge. In some examples, the mesh 80 is a geometric conversion from a digital file, such as a CAD geometry file. Other examples include the mesh 80 being based on spline geometry, and the mesh 80 being based on user-provided data such as position coordinates for the node points 81.

The computation assigns initial conditions to the node points 81 (block 34). In some examples, the initial conditions are based on user input. In other examples, the initial conditions include the physical factors and/or environmental factors determined for the geographic location at the start of the date range 20.

The process starts a corrosion calculation for the first time during the time schedule. The environmental factors are retrieved for the time (block 35). In some examples, the physical factors are also retrieved. The method determines exterior forces that are applied on the node points 81 (block 36). Examples of exterior forces include but are not limited to gravitational forces based on a direction of gravity relative to the mesh 80 (resulting in a static, non-moving force distribution), a force schedule over the time schedule caused by the object when moving (e.g., forces applied to an aircraft during flight), wind forces, thermal forces (e.g., radiative heating from reflection of solar rays), convective forces (e.g., forces due to wind moving across the surface of the mesh with a defined speed and direction), cleaning of the object, washing of the object, and changes in species concentrations in the ambient environment. The force schedule 74 can be input by a user, stored in memory, and/or retrieved from a remote source 70.

The process determines the presence of electrolyte film at the node points 81 (block 37). The film presence is calculated by an associated wetness condition 75 that is based on one or more of the environmental and physical factors. In some examples, a wetness condition occurs due to the following conditions: the relative humidity (RH) at the node point 81 being above a predetermined level; the temperature at the node point 81 being below the dew point temperature; and the proximal environmental condition at the node point 81, such as wall temperature, being below the dew point. If a wetness condition is determined, the process determines the film thickness. If there is not a wetness condition, then the process determines there is no corrosion for the given time. In some examples, the process assumes that the wetness condition is met and automatically proceeds to determining the film thickness.

The film thickness is calculated via a film thickness model 71. The film thickness model 71 can be accessed from a source 70 and/or maintained in memory circuitry. The film thickness calculation can include various methods. Examples include but are not limited to an analytical equation (e.g., Nusselt film model equation), a heuristic based on empirically measured lab values, a model fit, a machine-learned model, film models (e.g., for situations such as ice formation), and a more advanced physical simulation such as a full computational fluid dynamics simulation of the film.

Next, the environmental factors are determined for the node points 81 (block 38). In some examples, one or more of the environmental factors are the same for each node point 81 (e.g., relative humidity, dew point). In some examples, the process determines proximal environmental factors for the node points 81. The term "proximal" denotes the conditions most local to the node point 81. In some examples, the proximal calculation uses a physical model 72 such as a heat transfer model to determine the proximal temperature relative to the film temperature. In some examples, the heat transfer model calculates multiple layers. In one specific example, the calculation uses an ambient temperature for which an interior film temperature is determined from a convective heat transfer model, from which the proximal temperature is calculated from a conductive heat transfer model.

Once the physical and environmental factors are known, the method calculates the corrosion damage at the node points 81 (block 39). In some examples, the process uses a corrosion model 73. The corrosion model 73 can include various formats, with examples including but not limited to an analytical equation (e.g., a mathematical function of the proximal environmental conditions), an empirically-determined model fit, a machine-learned model, and a more advanced calculation such as a macro-molecular, chemical, or Monte Carlo simulation. The resulting corrosion damage at the node points 81 is saved for the given time within the time schedule (block 40).

The process then determines if there are additional times within the time schedule (block 41). For each additional time, the corrosion damage is determined for the node points 81. Once the corrosion has been determined for each of the times, the data is analyzed for the object 90. In some examples, this ends the process.

In other examples, one or more post-processing steps compute one or more additional desired properties (block 42). In some examples, the post-processing includes computing the total mass loss over the full exposed surface of the geometry. This can include summing all corrosion rates over the node points 81 for the times in the time schedule. In some examples, post-processing includes calculating a maximal corrosion rate. This includes calculating a maximum (supremum) of the corrosion rate over the node points 81 over the time in the time schedule. In some examples, post-processing includes calculating the total time of wetness (TOW), moisture presence across the object 90, total/average/distributed film thickness, and/or corrosion current density. In some examples, post-processing includes integrating over the corrosion current density to determine a total cumulative charge due to corrosion activities.

The output section 50 provides for outputting various corrosion data (block 51). Examples of output include corrosion data for the node points 81, cumulative corrosion data for the object 90, and various other data computed during the post-processing steps. The output can include corrosion data for one or more of the times from the time schedule, or a cumulative corrosion amount that factors the corrosion over the different input times.

In some examples, the process occurs during the design phase using lab testing and/or virtual testing to determine a corrosion prediction. The physical factors used for the corrosion calculations can be proposed design details of a proposed object 90. This provides for proposed design details of the object 90 to be tested and any necessary changes due to corrosion risk can be made early in the design process and prior to actual manufacturing. Additionally and/or alternatively, the environmental factors can be data other than historical, recorded data. In some examples, average environmental conditions for a given geographic location can be used for the corrosion testing. In other examples, higher level conditions can be used to ensure safety margins (e.g., 95th percentile relative humidity and dew point temperatures during the testing).

In some examples, one or more of the inputs 20 are predicted values based on conditions that are expected to be encountered by the object during use. For example, during design phase of an object, designers/engineers assign values to one or more of the environmental factors and/or physical factors that are expected to be experienced by the object.

Figure 5:
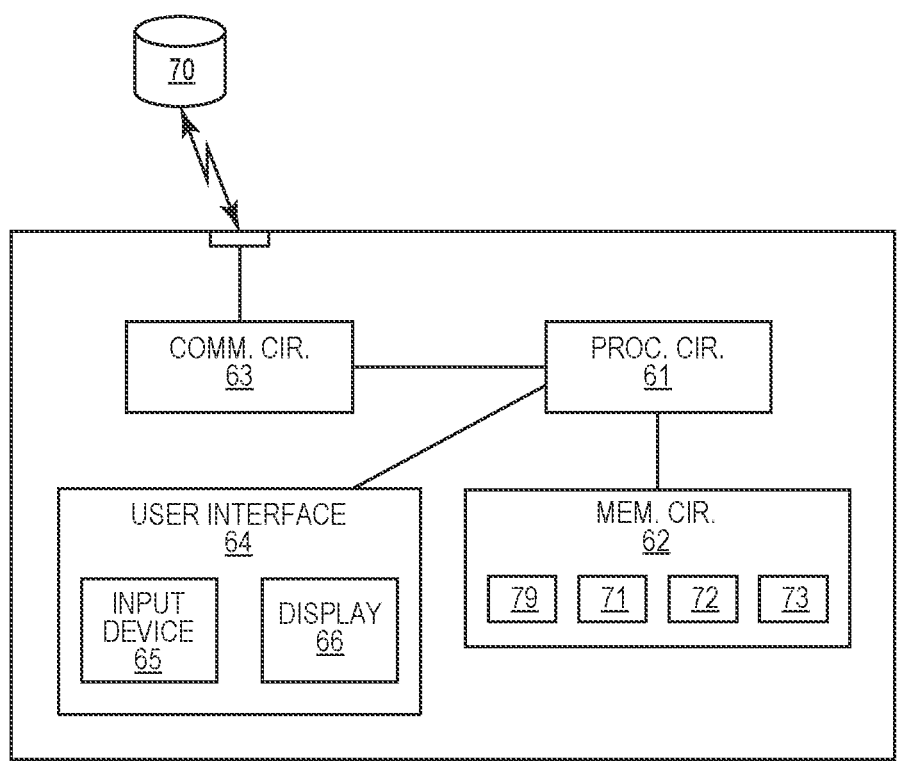
FIG. 5 is a schematic diagram of a computing device.

FIG. 5 illustrates a computing device 60 configured to perform the corrosion calculations. The computing device 60 can include a variety of different forms, including but not limited to a server computer, a workstation computer, a desktop computer, a smartphone, tablet computer, and a laptop computer. The computing device 60 can include one or more of each of a number of components such as, for example, processing circuitry 61 (e.g., processor unit) connected to a memory circuitry 62 (e.g., storage device).

The processing circuitry 61 may be composed of one or more processors alone or in combination with one or more memories. The processing circuitry 61 is generally computer hardware that is capable of processing information such as, for example, data, computer programs and/or other suitable electronic information. The processing circuitry 61 is composed of a collection of electronic circuits some of which may be packaged as an integrated circuit or multiple interconnected integrated circuits (an integrated circuit at times more commonly referred to as a "chip"). The processing circuitry 61 may be configured to execute programming instructions 79 such as the film thickness model 71, physical model 72, and corrosion model 73, which may be stored onboard the processing circuitry 61 or otherwise stored in the memory circuitry 62 (of the same or another device).

The processing circuitry 61 may be a number of processors, a multi-core processor or some other type of processor, depending on the particular implementation. Further, the processing circuitry 61 may be implemented using a number of heterogeneous processor systems in which a main processor is present with one or more secondary processors on a single chip. As another illustrative example, the processing circuitry 61 may be a symmetric multi-processor system containing multiple processors of the same type. In yet another example, the processing circuitry 61 may be embodied as or otherwise include one or more ASICs, FPGAs or the like. Thus, although the processing circuitry 61 may be capable of executing a computer program to perform one or more functions, the processing circuitry 61 of various examples may be capable of performing one or more functions without the aid of a computer program. In either instance, the processing circuitry 61 may be appropriately programmed to perform functions or operations according to example implementations of the present disclosure.

The memory circuitry 62 is generally computer hardware that is capable of storing information such as, for example, data, computer programs (e.g., computer-readable program code) and/or other suitable information either on a temporary basis and/or a permanent basis. The memory circuitry 62 may include volatile and/or non-volatile memory and may be fixed or removable. Examples of suitable memory circuitry 62 include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory circuitry 62 may be referred to as a computer-readable storage medium. The computer-readable storage medium is a non-transitory device capable of storing information and is distinguishable from computer-readable transmission media such as electronic transitory signals capable of carrying information from one location to another. Computer-readable medium as described herein may generally refer to a computer-readable storage medium or computer-readable transmission medium.

Computing device 60 also includes communications interface circuitry 63 configured to transmit and/or receive information, such as to and/or from the sources 70, user devices, other apparatus(es), network(s) or the like. The communications interface circuitry 63 may be configured to transmit and/or receive information by physical (wired) and/or wireless communications links. Examples of suitable communication interfaces include a network interface controller (NIC), wireless NIC (WNIC) or the like. The communications interface circuitry 63 may have one or more transmitters and/or receivers.

A user interface 64 provides for a user to control one or more aspects of the corrosion testing. The user interface 64 includes one or more input devices 65 such as but not limited to a keypad, touchpad, roller ball, and joystick. The user interface 64 also includes one or more displays 66 for displaying information regarding the testing and/or for an operator to enter commands to the processing circuitry 61.

As will be appreciated by those of ordinary skill in the art without undue experimentation, programming instructions 79 may be loaded onto a computing device or other programmable apparatus from a computer-readable storage medium to produce a particular machine, such that the particular machine becomes a means for implementing the functions specified herein. These programming instructions 79 may also be stored in a computer-readable storage medium that can direct a computer, a processing circuitry or other programmable apparatus to function in a particular manner to thereby generate a particular machine or particular article of manufacture. The programming instructions 79 may be retrieved from a computer-readable storage medium and loaded into a computer, processing circuitry or other programmable apparatus to configure the computing device 60, processing circuitry 61 or other programmable apparatus to execute operations to be performed on or by the computer, processing circuitry or other programmable apparatus.

Retrieval, loading and execution of the programming instructions 79 may be performed sequentially such that one instruction is retrieved, loaded and executed at a time. In some example implementations, retrieval, loading and/or execution may be performed in parallel such that multiple programming instructions 79 are retrieved, loaded, and/or executed together. Execution of the programming instructions 79 may produce a computer-implemented process such that the programming instructions 79 executed by the computer, processing circuitry or other programmable apparatus provide operations for implementing functions described herein.

This invention allows for the prediction of corrosion damage behavior over time in a changing environment, in which an object may be stored or used. The present application accounts for the development of continuous or discontinuous films that may change over time and are different across the surface geometry of the vehicle platform. This can be used to predict corrosion damage or possible moisture-induced damage issues in objects 90 that are stored for lengthy periods. This invention can also be used to study and predict the effects of environmental changes on the damages incurred due to corrosion during storage or usage.

The present application may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining corrosion of an object that occurs over a time period, the method comprising:
   determining one or more physical factors of the object;
   determining a mesh of the object based on the one or more physical factors, the mesh corresponding to a surface geometry of the object;
   determining a plurality of node points included in the mesh of the object;
   determining environmental factors that occur during the time period;
   at a plurality of times during the time period, determining the corrosion of the object at each of the plurality of node points based on the physical factors and the environmental factors; and
   determining a cumulative corrosion of the object based on the corrosion determined at each of the plurality of node points at each of the plurality of times.

2. The method of claim 1, further comprising determining the environmental factors based on historical weather data for one or more geographic locations where the object was located during the time period.

3. The method of claim 1, wherein determining the physical factors comprises determining a shape of the object and a material of the object.

4. The method of claim 1, further comprising, for each of the plurality of times, determining whether a wetness condition occurs and determining that the corrosion is zero when the wetness condition does not occur.

5. The method of claim 1, further comprising determining external forces that are applied to the object over the time period.

6. The method of claim 1, further comprising determining the physical factors of the object based on a date range and a geographic location received from a user.

7. The method of claim 1, further comprising:
   determining whether a wetness condition occurs at each of the plurality of node points at each of the plurality of times; and
   determining that there is no corrosion at each of the plurality of node points for the plurality of times when the wetness condition does not occur.

8. A method of determining corrosion of an object that occurs over a time period, the method comprising:
   determining one or more physical factors of the object;
   determining environmental factors for a geographic location of the object for a time period;
   determining a mesh of the object based on the one or more physical factors, the mesh corresponding to a surface geometry of the object and including a plurality of node points that are spaced apart;

at each of a plurality of times that occur during the time period, determining corrosion at each of the plurality of node points included in the mesh of the object; and accumulating the corrosion for the plurality of times at each of the plurality of node points and determining a cumulative corrosion of the object.

9. The method of claim 8, further comprising receiving inputs comprising a date range of the time period, the geographic location, and an identification of the object.

10. The method of claim 8, further comprising receiving a geometric model of the object and determining positioning of each of the plurality of node points on the object based on the geometric model.

11. The method of claim 8, wherein the environmental factors comprise two or more of relative humidity, precipitation, temperature, and dew point.

12. The method of claim 8, further comprising:
determining whether a wetness condition occurs at each of the plurality of node points at each of the plurality of times; and
determining that there is no corrosion at each of the plurality of node points for the plurality of times when the wetness condition does not occur.

13. The method of claim 8, wherein the time period is a historic period that has already occurred and the environmental factors are based on weather conditions that occurred at the geographic location during the time period.

14. The method of claim 8, wherein the physical factors and environmental factors comprise predicted factors based on conditions that expected to be encountered by the object during use.

15. The method of claim 8, wherein the object is an aircraft and the geographic location comprises a plurality of locations where the aircraft traveled during the time period.

16. A computing device configured to determine corrosion of an object, the computing device comprising:
memory circuitry that stores program instructions; and
processing circuitry configured to execute the programming instructions to cause the computing device to:
receive a date range, a geographic location of the object, and an identification of the object;
determine a mesh of the object based on the identification of the object, the mesh corresponding to a surface geometry of the object and including a plurality of node points; and
for a plurality of times during the time period:
determine external forces that are exerted at each of the plurality of node points;
determine a film thickness at each of the plurality of node points;
determine environmental conditions at each of the plurality of node points; and
determine corrosion at each of the plurality of node points based on the external forces, the film thickness, and the environmental conditions.

17. The computing device of claim 16, wherein the processing circuitry is further configured to determine a cumulative corrosion of the object based on the corrosion at each of the plurality of node points for the plurality of times.

18. The computing device of claim 16, wherein the processing circuitry is further configured to determine a wetness condition for each of the plurality of node points at each of the plurality of times and determine the film thickness on the node points based on the wetness condition.

19. The computing device of claim 18, wherein the processing circuitry is further configured to determine there is no film thickness at each of the plurality of node points when the wetness condition does not occur.

20. The computing device of claim 16, wherein the processing circuitry is further configured to determine from a remote source environmental factors that act on the object during the plurality of times.

* * * * *